(12) United States Patent
Mital et al.

(10) Patent No.: US 9,390,527 B2
(45) Date of Patent: Jul. 12, 2016

(54) USING CINEMATIC TECHNIQUE TAXONOMIES TO PRESENT DATA

(75) Inventors: Vijay Mital, Kirkland, WA (US); Suraj T. Poozhiyil, Redmond, WA (US); Darryl Rubin, Duvall, WA (US); Amir Netz, Bellevue, WA (US); Olivier Colle, Bellevue, WA (US); Andrew Douglas Reddish, Redmond, WA (US); Christian Beaumont, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 469 days.

(21) Appl. No.: 13/495,979

(22) Filed: Jun. 13, 2012

(65) Prior Publication Data

US 2013/0335420 A1 Dec. 19, 2013

(51) Int. Cl.
*G06T 11/20* (2006.01)
*G06T 13/80* (2011.01)
*G06T 19/20* (2011.01)

(52) U.S. Cl.
CPC ............... *G06T 11/206* (2013.01); *G06T 13/80* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,137,499 A | 10/2000 | Tesler | |
| 7,975,226 B2 | 7/2011 | Blose et al. | |
| 7,975,239 B2 | 7/2011 | Bellotti et al. | |
| 8,296,675 B2 | 10/2012 | Falchuk | |
| 2004/0008180 A1* | 1/2004 | Appling, III | G11B 27/031 345/156 |
| 2004/0054542 A1* | 3/2004 | Foote et al. | 704/500 |
| 2005/0265580 A1 | 12/2005 | Antonucci et al. | |
| 2005/0268279 A1* | 12/2005 | Paulse | G06F 8/38 717/110 |
| 2008/0309647 A1* | 12/2008 | Blose et al. | 345/204 |
| 2009/0027549 A1 | 1/2009 | Weisgerber | |
| 2009/0094518 A1 | 4/2009 | Lawther et al. | |
| 2009/0216808 A1 | 8/2009 | Wallace | |
| 2009/0307207 A1* | 12/2009 | Murray | G06F 17/30026 |
| 2010/0037138 A1* | 2/2010 | Shcherbakov et al. | 715/716 |
| 2010/0057618 A1 | 3/2010 | Spicer et al. | |
| 2010/0118049 A1 | 5/2010 | Bobrow et al. | |
| 2010/0194778 A1 | 8/2010 | Robertson et al. | |
| 2010/0199181 A1 | 8/2010 | Robertson et al. | |
| 2010/0229121 A1 | 9/2010 | Falchuk | |

(Continued)

OTHER PUBLICATIONS

Wang, et al., "Film Narrative Exploration Through the Analysis of Aesthetic Elements", In Proceedings of the 13th International Multimedia Modeling Conference, vol. 4351, Jan. 9-12, 2007, pp. 606-615.

(Continued)

*Primary Examiner* — Tize Ma
*Assistant Examiner* — Yu Chen
(74) *Attorney, Agent, or Firm* — Kate Drakos; Aaron Hoff; Micky Minhas

(57) ABSTRACT

The present invention extends to methods, systems, and computer program products for using cinematic technique taxonomies to present data. Embodiments of the invention can be used to infer and identify cinematic techniques or combinations thereof based on a model and user action. Cinematic techniques can be used to meet the data exploration and analysis requirements of a user. As such, embodiments of the invention permit users (including non-programmers) to employ cinematic techniques from a cinematic technique hierarchy (possibly in combination with other techniques) to gain insights into their data and also convey appropriate emotional messages.

20 Claims, 3 Drawing Sheets

(56) References Cited

U.S. PATENT DOCUMENTS

| | | | |
|---|---|---|---|
| 2011/0093805 A1 | 4/2011 | Ekhager et al. | |
| 2011/0106589 A1 | 5/2011 | Blomberg et al. | |
| 2011/0131496 A1* | 6/2011 | Abram et al. | 715/722 |
| 2011/0249003 A1 | 10/2011 | Mercuri | |
| 2012/0260172 A1 | 10/2012 | Friedlander et al. | |
| 2013/0330056 A1 | 12/2013 | Abecassis | |
| 2013/0339351 A1 | 12/2013 | Mital et al. | |
| 2013/0339860 A1 | 12/2013 | Mital et al. | |

OTHER PUBLICATIONS

Hsueh, Michael, "PhotoVis: Visualization of Digital Photograph Metadata", In Technical Report of Electrical Engineering and Computer Sciences University of California at Berkeley, May 9, 2011, 10 pages.

Keim, Daniel A., "Information Visualization and Visual Data Mining", In Proceedings of IEEE Transactions on Visulization and Computer Graphics, vol. 7, Issue 1, Jan.-Mar. 2002, pp. 100-107.

Gobel, et al., "INVISIP: Metadata-based Information Visualization Techniques to Access Geodata Archives and to Support the Site Planning Process", In Proceedings of 3rd CODATA Euro- American Workshop on Information Visualization Presentation and Design, Jul. 10-11, 2002, 4 pages.

Cruz, et al., "A Layered Architecture for the Exploration of Heterogeneous Information Using Coordinated Views", In Proceedings of IEEE Symposium on Visual Languages—Human Centric Computing, Sep. 26-29, 2004, pp. 11-18.

Manovich, Lev, "Media Visualization: Visual Techniques for Exploring Large Media Collections", Published on: Jun. 2011, Available at: http://manovich.net/DOCS/media_visualization.2011.pdf.

Moroney, Laurence, "Visualizing Information with .NET", In MSDN Magazine, Aug. 2009.

Bichler, Patrick, "Visualization Framework for Information Graphs an Incremental Approach", Published on: Feb. 2002, Available at: http://e-collection.library.ethz.ch/eserv/eth:25004/eth-25004-01.pdf.

Gasser, Ray, "Using MATLAB to Visualize Scientific Data", Published on: Aug. 28, 2009, Available at: http://www.bu.edu/tech/research/training/tutorials/visualization-with-matlab/.

Heer, et al., "Animated Transistions in Statistical Data Graphics", In IEEE Transactions on Visualization and Computer Graphics, vol. 13 No. 6, Nov.-Dec. 2007, pp. 1240-1247.

Office Action dated Oct. 7, 2014 cited in U.S. Appl. No. 13/517,516.

"International Search Report & Written Opinion for PCT Patent Application No. PCT/US2013/043960", Mailed Date: Dec. 9, 2013, Filed Date: Jun. 4, 2013, 8 Pages.

Office Action dated Apr. 16, 2015 cited in U.S. Appl. No. 13/495,952.

Notice of Allowance dated May 5, 2015 cited in U.S. Appl. No. 13/517,516.

Office Action dated Jul. 23, 2015 cited in U.S. Appl. No. 13/495,952.

Office Action dated Nov. 5, 2015 cited in U.S. Appl. No. 13/495,952.

* cited by examiner

USING CINEMATIC TECHNIQUE TAXONOMIES TO PRESENT DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Users can gain or share insight on their data through visualizations like charts, graphs, maps and hierarchies. These visualizations have simple and commonly used mechanisms using object color (hues, saturation and transparency), text (font families and styles) and visibility to emphasize, denote selection and highlight insights for exploring and analyzing the underlying data. In some environments, due at least in part to their simplicity, these visualizations make it difficult for users to effectively gain/share insights about their data. In turn, it is also difficult to convey an appropriate emotional message and have a highly interactive user experience.

BRIEF SUMMARY

The present invention extends to methods, systems, and computer program products for using cinematic technique taxonomies to present data. A portion of data is accessed from a data repository. The portion of data has meaning based on data values contained in the portion of data. User requirements for presenting the portion of data are accessed. The user requirements indicate a user desired message to convey when presenting the portion of data.

One or more cinematic techniques are identified for presenting data in a manner that conveys the user desired message. The one or more cinematic techniques are identified from within a taxonomy of cinematic techniques. The portion of data is presented at a display device to convey the user desired message. The user desired message is conveyed by presenting the values contained in the portion of data in accordance with the one or more cinematic techniques identified from within the taxonomy of cinematic techniques.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
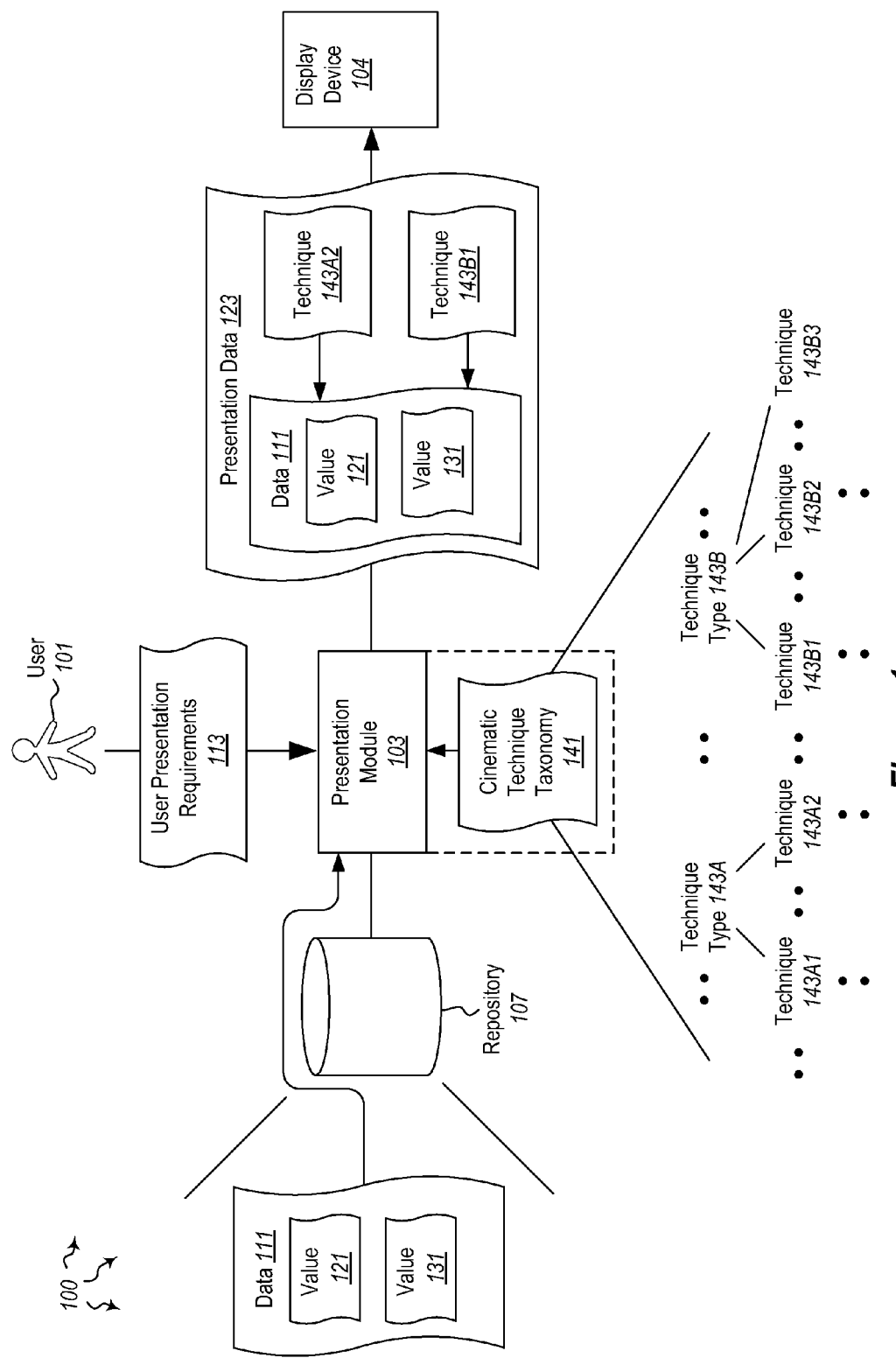
FIG. 1 illustrates an example computer architecture that facilitates using cinematic technique taxonomies to present data.

The present invention extends to methods, systems, and computer program products for using cinematic technique taxonomies to present data. A portion of data is accessed from a data repository. The portion of data has meaning based on data values contained in the portion of data. User requirements for presenting the portion of data are accessed. The user requirements indicate a user desired message to convey when presenting the portion of data.

One or more cinematic techniques are identified for presenting data in a manner that conveys the user desired message. The one or more cinematic techniques are identified from within a taxonomy of cinematic techniques. The portion of data is presented at a display device to convey the user desired message. The user desired message is conveyed by presenting the values contained in the portion of data in accordance with the one or more cinematic techniques identified from within the taxonomy of cinematic techniques.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the in the following claims, "cinematic techniques" are defined as techniques used in cinematography. Cinematic techniques can relate to camera position, camera angle, lighting, movement, transitions, sound, expression (depth and perspective), etc. Cinematic techniques can include: cross-cutting, jump cutting, continuity cuts, match cuts, deep focus, eye-line matching, different shots (close-up, medium, long shot, tilt, aerial, etc.), fade ins, fade outs, flashbacks, focus, iris in/iris out, key lighting, master shots, medium shots, montages, panning, point of view shots, pull back shots, reverse angles, tracking, zooming, backlighting, fill lighting, flood lighting, mood lighting, soft lighting, diegetic sound, non-diegetic sound, etc. A variety of other cinematic techniques can also be used.

In some embodiments, cinematic techniques are arranged in a taxonomy, such as, for example, a hierarchical structure of one or more trees. A root node for each tree can represent a cinematic technique (e.g., camera movement techniques) and lower level nodes can represent different implementations (e.g., pan, zoom, track, etc.) of the cinematic technique. A taxonomy of cinematic techniques can be a separate data structure or can be codified into a data presentation module.

FIG. 1 illustrates an example computer architecture 100 that facilitates using cinematic technique taxonomies to present data. Referring to FIG. 1, computer architecture 100 includes repository 107, presentation module 103, and display device 104. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, repository 107 stores data, such as, for example, data for user 121. Stored data can have values that give meaning to data. For example, the stored data can be sales figures. Thus, values for part numbers, sales percentages, revenues, descriptions, addresses, etc., within the stored data can give meaning to how well various items are selling.

Presentation module 103 is configured to receive a portion of stored data and user presentation requirements. User presentation requirements can indicate a user desired message to convey when presenting the portion of data. Presentation module 103 can infer the user desired message from the user presentation requirements. Based on the user desired message, presentation module 103 can identify cinematic techniques for presenting data in a manner that conveys the user desired message.

Cinematic techniques can be identified from within cinematic technique taxonomy 141. As depicted, cinematic technique taxonomy 141 includes technique type 143A and technique type 143B. The horizontal ellipses before, between, and after technique types 143A and 143B represent that cinematic technique taxonomy 141 can also include other types of cinematic techniques. In some embodiments, cinematic technique taxonomy 141 is stored separately from presentation module 103. In other embodiments, cinematic technique taxonomy 141 is codified into presentation module 103.

Technique type 143A (e.g., audio) includes techniques 143A1 (e.g., diegetic sound) and 143A2 (e.g., non-diegetic sound). The horizontal ellipses before, between, and after technique types 143A1 and 143A2 represent that other techniques of technique type 143A can be included in cinematic technique taxonomy 141. The vertical ellipsis below technique 143A1 represents that further sub-techniques of technique 143A1 (e.g., character voices, source music, sound effects, etc.) can be included in cinematic technique taxonomy 141. The vertical ellipsis below technique 143A2 represents that further sub-techniques of technique 143A2 (e.g., narrator's commentary, mood music, etc.) can be included in cinematic technique taxonomy 141.

Technique type 143B (e.g., camera position) includes techniques 143B1 (e.g., close up), 143B2 (e.g., long shot), and 143B3 (e.g., medium shot). The horizontal ellipses before, between, and after technique types 143B1, 143B2, and 143B represent that other techniques of technique type 143B can be included in cinematic technique taxonomy 141. The vertical ellipsis below technique 143B1 represents that further sub-techniques of technique 143B1 (e.g., medium close up, extreme close up, etc.) can be included in cinematic technique taxonomy 141. The vertical ellipsis below technique 143B2 represents that further sub-techniques of technique 143A2 (e.g., extreme long shot, establishing shot, etc) can be included in cinematic technique taxonomy 141.

Presentation module 103 can formulate presentation data for presenting the stored data at a display device to convey the user desired message. The user desired message can be conveyed by presenting values from the stored data in accordance with the identified cinematic techniques. Presentation module 103 can send presentation data to a display device.

Display device 104 is configured to receive presentation data. Display device 104 can display the presentation data in accordance with identified cinematic techniques to convey a user desired message.

Figure 2:
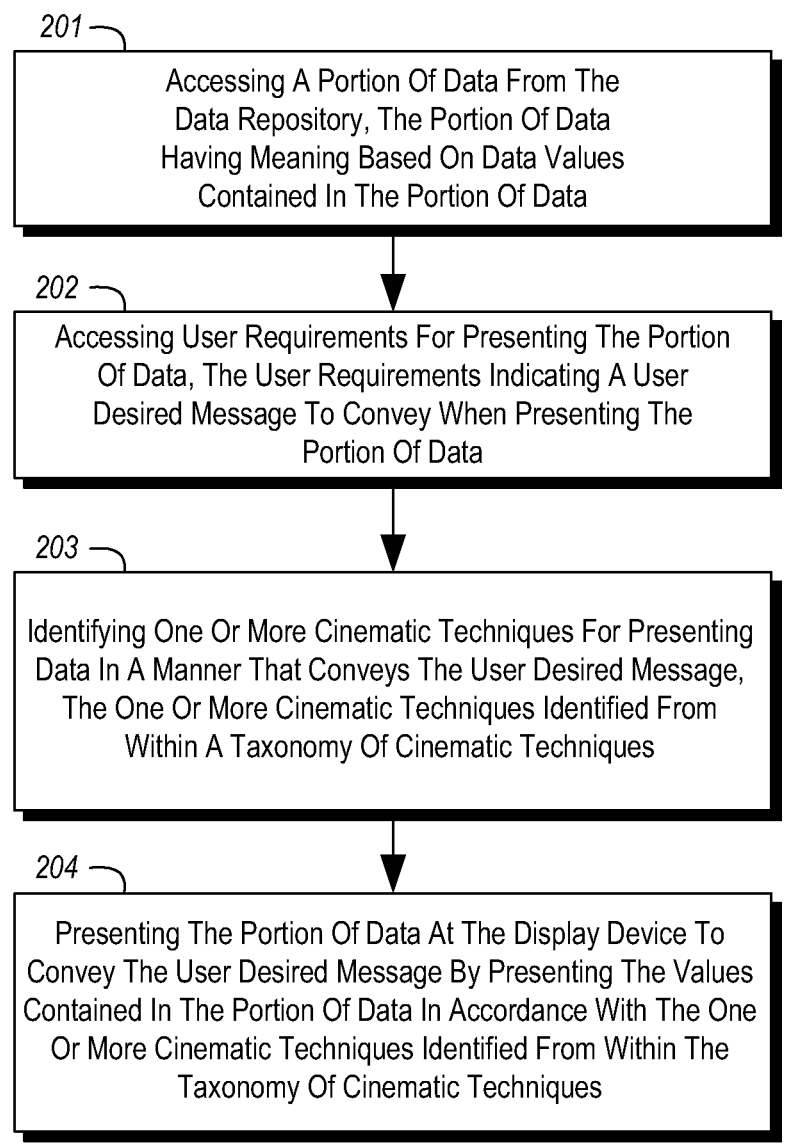
FIG. 2 illustrates a flow chart of an example method for using cinematic technique taxonomies to present data.

FIG. 2 illustrates a flow chart of an example method 200 for using cinematic technique taxonomies to present data. Method 200 will be described with respect to the components and data of computer architecture 100.

Method 200 includes an act of accessing a portion of data from a data repository, the portion of data having meaning based on data values contained in the portion of data (act 201). For example, presentation module 103 can access data 111 from repository 107. Data 111 has meaning based on values 121, 131, etc. (e.g., addresses, names, numbers, etc.) in data 111.

Method 200 includes an act of accessing user requirements for presenting the portion of data, the user requirements indicating a user desired message to convey when presenting the portion of data (act 202). For example, user 101 can send user presentation requirements 113 to presentation module 103. Presentation module 103 can access user presentation requirements 113. User presentation requirements 113 can indicate a user desired message, for example, an emotional message, such as, happy, sad, professional, upbeat, sarcastic, etc. Formulating a user desired message can include the use of visual objects/properties.

Data presentation module 103 can access cinematic technique hierarchy 141. In some embodiments, data presentation module 103 accesses cinematic technique hierarchy 141 from an external storage location. In other embodiments, for example, when cinematic technique hierarchy 141 is codified into data presentation module 103, data presentation module 103 accesses cinematic technique hierarchy 141 internally.

Method 200 includes an act of identifying one or more cinematic techniques for presenting data in a manner that conveys the user desired message, the one or more cinematic techniques identified from within a cinematic technique taxonomy (act 203). For example, presentation module 103 can identify technique 143A2 (e.g., non-diegetic sound) and technique 143B1 (e.g., close up) from within cinematic technique hierarchy 141. Cinematic technique 143A2 and technique cinematic 143B1 are for presenting data 111 in a manner that conveys the user desired message indicated in user presentation requirements 113 (e.g., through visual objects/properties).

Presentation module 103 can infer the user desired message from user presentation requirements 113. It may be that a plurality of different combinations of one or more cinematic techniques can be used to convey the user desired message. Presentation module 103 can select one of the plurality of different combinations to convey the used desired message.

Method 200 includes an act of presenting the portion of data at the display device to convey the user desired message by presenting the values contained in the portion of data in accordance with the identified one or more cinematic techniques identified from within the taxonomy of cinematic techniques (act 204). For example, presentation module 103 can formulate presentation data 123 for presenting data 111 in accordance with techniques 143A2 and 143B1. Presentation module 103 can send presentation data 123 to display device 104. Presentation data 123 can be presented at display device 104. As such, data 111 can be presented at display device 104 to convey the user desired message (in user presentation requirements 113) by presenting values 121, 131, etc., in accordance with techniques 143A2 and 143B1.

Figure 3:
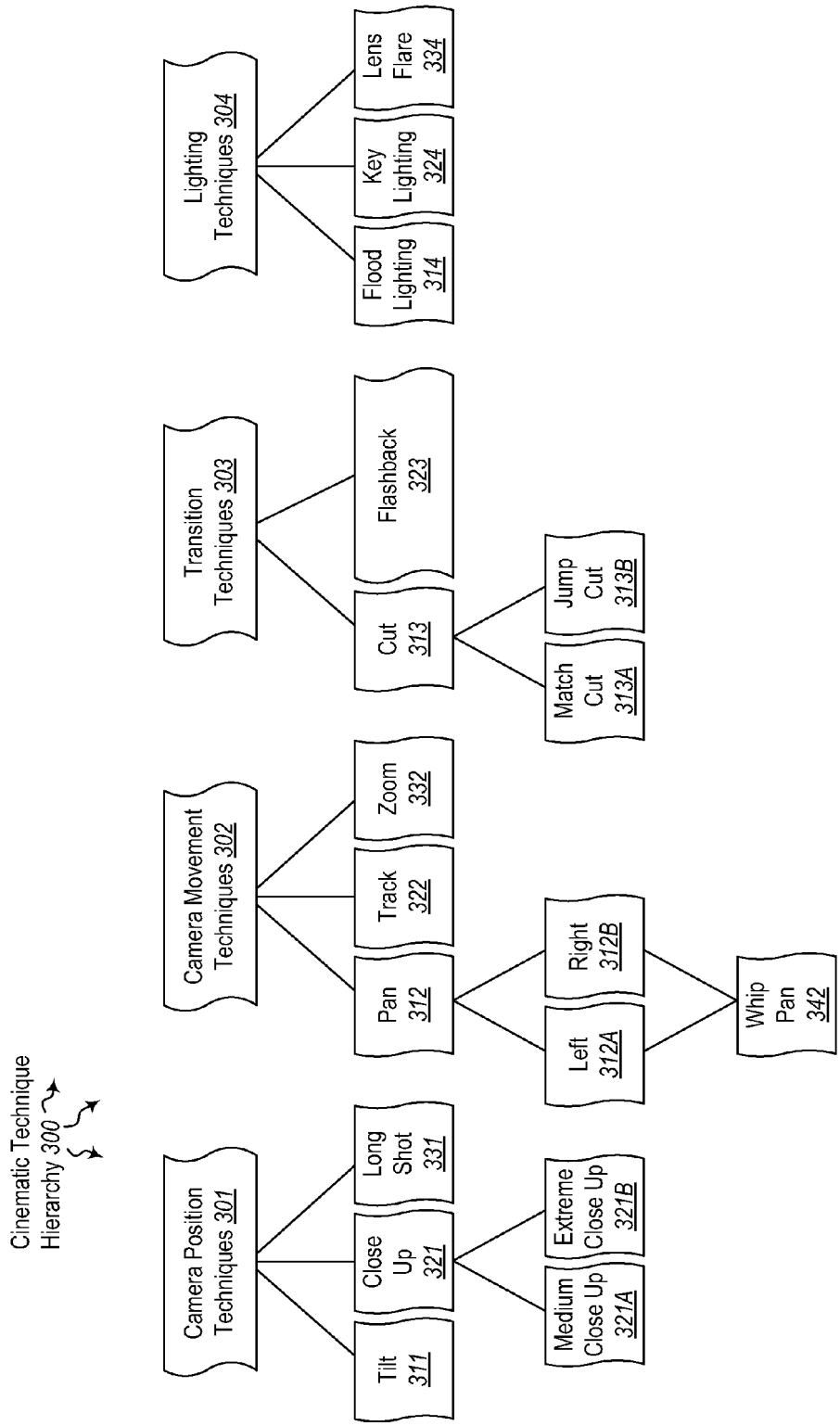
FIG. 3 illustrates an example hierarchy of cinematic techniques.

FIG. 3 illustrates an example cinematic technique hierarchy 300. As depicted, cinematic technique hierarchy 300 includes camera position techniques 301, camera movement techniques 302, transition techniques, and lighting techniques 304. Camera position techniques 301 further include tilt 311, close up 321, and long shot 331. Close up 321 further includes medium close up 321A and extreme close up 321B.

Camera movement techniques 302 include pan 312, track 322, and zoom 332. Pan 312 further includes left 312A (representing panning left) and right 312B (representing panning right). Whip pan 342 represents that either left or right panning can be in the form of a whip pan. Transition techniques 303 include cut 313 and flashback 323. Cut 303 further includes match cut 313A and jump cut 313B. Lighting techniques 304 include flood lighting 314, key lighting 324, and lens flare 334.

Cinematic techniques for presenting data can be selected from intermediate or leaf locations for a technique. For less specificity, higher level locations in cinematic technique hierarchy 300 can be selected. On the other hand, lower level locations in cinematic technique hierarchy 300 provide more specificity for a cinematic technique. For example, if panning is identified, the direction or type of panning may not matter when conveying a user desired message. As such, a pan 312 can be selected. Pan 312 can correspond to a default speed and direction of panning. On the other hand, there may additional user meaning in panning to the right. Thus, right 312A can be selected. Right 312A can correspond to panning at a default speed to the right.

In some embodiments, data visualizations are associated with visualization metadata. The visualization metadata can indicate visual objects or properties to which data can be bound. The visualization metadata can also indicate ways in which visual objects or properties can be changed (e.g., scaled, transformed, re-colored, etc.). The visualization metadata can also indicate the constraints on values that a visual object or property can take (e.g., aesthetic rules, rules or proportion, etc).

Data metadata can be used to describe the shape of data. The data metadata can indicate whether data continuous values, or discrete, or small set of enumerable discrete values, whether there are ranges, whether there is some geometric implication (e.g. location or physical design or coordinates), etc. Data metadata can also indicate relationships within sets, such as, for example, whether it's a list of peer values or of alternatives and whether outliers can be discarded. Data metadata can also indicate whether the data is meaningfully sampleable/quantizable/smoothable.

In these embodiments, presentation module 103 can include logic for identifying and applying appropriate cinematic techniques. Presentation module 103 can go through visualization metadata and data metadata. Presentation module 103 can identify sets of visual objects/properties, mappings of visual objects/properties to elements of data, and the relationships between visual objects/properties and elements of data. Presentation module 103 can then identify the cinematic techniques or combinations thereof from a cinematic taxonomy based on above relationships. Presentation module 103 can generate multiple choices of 'styles', apply one as the default, and show a user the 'effect' of applying this technique. However, not all the styles generated, nor all the available combinations, need be proposed for applying to a particular choice set).

Other data presentation techniques, such as, for example, charts, graphs, maps, hierarchies, etc. can be used along with cinematic techniques. These other data presentation techniques can use object color (hues, saturation, and transparency), text (font families and styles), and visibility to assist with exploring and analyzing data.

Accordingly, embodiments of the invention can be used to infer and identify cinematic techniques or combinations thereof based on a model and user action. Cinematic techniques can be used to meet the data exploration and analysis requirements of a user. As such, embodiments of the invention permit users (including non-programmers) to employ cinematic techniques from a cinematic technique hierarchy (possibly in combination with other techniques) to gain insights into their data and also convey appropriate emotional messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for using cinematic techniques to present data, the method being performed by one or more processors executing executable instructions, and comprising the following acts:
   storing, at a data repository, user data that includes values which convey meaning to the data for a particular user;
   retrieving, with one or more processors configured as a presentation module, a portion of the stored data from the data repository;
   receiving, at the presentation module, user requirements that indicate a desired message of the particular user, wherein the desired message is conveyed by a presentation of the retrieved portion of the stored data, and wherein the presentation module is configured by the one or more processors to access a taxonomy of one or more cinematic techniques that are stored at the presentation module,
      wherein the taxonomy of the one or more stored cinematic techniques comprises a hierarchal structure that includes at least the following:
         a root node that represents one cinematic technique of the one or more stored cinematic techniques, and
         a lower level node that depends on the root node and that represents a specific implementation of the one cinematic technique as represented by the root node;
   based on the received user requirements, the presentation module identifying the one or more cinematic techniques as having visual objects or properties that correspond to the user requirements for presenting the retrieved data in a manner that reflects the particular user's desired message; and
   presenting the retrieved data at a display device to convey the user desired message by presenting the retrieved data in accordance with the identified one or more cinematic techniques that were identified from the taxonomy of cinematic techniques based on the user requirements.

2. The computer-implemented method as recited in claim 1, wherein the desired message to convey reflects an emotional message.

3. The computer-implemented method as recited in claim 1, wherein the act of identifying one or more cinematic techniques comprises identifying cinematic techniques relating to one or more of: camera position, camera movement, transitions, lighting, and audio from within a taxonomy of cinematic techniques.

4. The computer-implemented method as recited in claim 3, wherein the act of identifying one or more cinematic techniques comprises an act of identifying a cutting technique for presenting data in a manner that conveys the user desired message.

5. The computer-implemented method as recited in claim 3, wherein the act of identifying one or more cinematic techniques comprises an act of identifying a fading technique for presenting data in a manner that conveys the user desired message.

6. The computer-implemented method as recited in claim 1, wherein the act of identifying one or more cinematic techniques comprises:
   an act of inferring data metadata indicating the shape of the retrieved data; and
   an act of identifying a cinematic technique based on the data metadata.

7. The computer-implemented method as recited in claim 1, wherein the act of presenting the retrieved data at the display device comprises an act of using other presentation techniques along with the cinematic techniques.

8. The computer-implemented method as recited in claim 1, wherein the act of presenting the retrieved data at the display device comprises an act of presenting the retrieved data to aid in data exploration of the data repository.

9. One or more computer storage devices having stored thereon computer-executable instructions that are executable at a processor to cause a computer system to perform a computer-implemented method for using cinematic techniques to present data, wherein the computer-implemented method comprises the following acts:
   storing, at a data repository, user data that includes values which convey meaning to the data for a particular user;
   retrieving, with one or more processors configured as a presentation module, a portion of the stored data from the data repository;
   receiving, at the presentation module, user requirements that indicate a desired message of the particular user, wherein the desired message is conveyed by a presentation of the retrieved portion of the stored data, and wherein the presentation module is configured by the one or more processors to access a taxonomy of one or more cinematic techniques that are stored at the presentation module,
  wherein the taxonomy of the one or more stored cinematic techniques comprises a hierarchical structure that includes at least the following:
    a root node that represents one cinematic technique of the one or more stored cinematic techniques, and
    a lower level node that depends on the root node and that represents a specific implementation of the one cinematic technique as represented by the root node;
based on the received user requirements, the presentation module identifying the one or more cinematic techniques as having visual objects or properties that correspond to the user requirements for presenting the retrieved data in a manner that reflects the particular user's desired message; and
presenting the retrieved data at a display device to convey the user desired message by presenting the retrieved data in accordance with the identified one or more cinematic techniques that were identified from the taxonomy of cinematic techniques based on the user requirements.

10. One or more computer storage devices as recited in claim 9, wherein the desired message to convey reflects an emotional message.

11. One or more computer storage devices as recited in claim 9, wherein identifying cinematic techniques comprises identifying cinematic techniques relating to one or more of: camera position, camera movement, transitions, lighting, and audio from within a taxonomy of cinematic techniques.

12. One or more computer storage devices as recited in claim 9, wherein the computer-implemented method further comprises:
  inferring data metadata indicating the shape of the accessed portion of data; and
  identifying a cinematic technique based on the data metadata.

13. A computer system comprising:
  one or more processors;
  system memory; and
  one or more computer storage devices having stored thereon computer-executable instructions that are executable by the one or more processors to cause the one or more processors to perform a computer-implemented method for using cinematic techniques to present data, wherein the computer-implemented method comprises the following acts:
    storing, at a data repository, user data that includes values which convey meaning to the data for a particular user;
    retrieving, with one or more processors configured as a presentation module, a portion of the stored data from the data repository;
    receiving, at the presentation module, user requirements that indicate a desired message of the particular user, wherein the desired message is conveyed by a presentation of the retrieved portion of the stored data, and
    wherein the presentation module is configured by the one or more processors to access a taxonomy of one or more cinematic techniques that are stored at the presentation module,
      wherein the taxonomy of the one or more stored cinematic techniques comprises a hierarchical structure that includes at least the following:
        a root node that represents one cinematic technique of the one or more stored cinematic techniques, and
        a lower level node that depends on the root node and that represents a specific implementation of the one cinematic technique as represented by the root node;
    based on the received user requirements, the presentation module identifying the one or more cinematic techniques as having visual objects or properties that correspond to the user requirements for presenting the retrieved data in a manner that reflects the particular user's desired message; and
    presenting the retrieved data at a display device to convey the user desired message by presenting the retrieved data in accordance with the identified one or more cinematic techniques that were identified from the taxonomy of cinematic techniques based on the user requirements.

14. The computer system as recited in claim 13, wherein the desired message to convey reflects an emotional message.

15. The computer system as recited in claim 13, wherein identifying one or more cinematic techniques comprises identifying a panning technique.

16. The computer system as recited in claim 13, wherein identifying one or more cinematic techniques comprises identifying a cutting technique.

17. The computer system as recited in claim 13, wherein identifying one or more cinematic techniques comprises identifying a fading technique.

18. The computer system as recited in claim 13, wherein identifying one or more cinematic techniques comprises:
  inferring data metadata indicating the shape of the accessed portion of data; and
  identifying a cinematic technique based on the data metadata.

19. The computer system as recited in claim 13, wherein presenting the retrieved data at the display device comprises using other presentation techniques along with the cinematic techniques.

20. The computer system as recited in claim 13, wherein presenting the retrieved data at the display device comprises presenting the retrieved data to aid in data exploration of the data repository.

* * * * *